No. 719,104. PATENTED JAN. 27, 1903.
R. & G. FREY.
REMOVABLE DRIP PAN FOR REFRIGERATORS.
APPLICATION FILED NOV. 11, 1902.
NO MODEL.
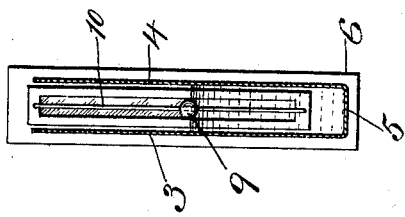
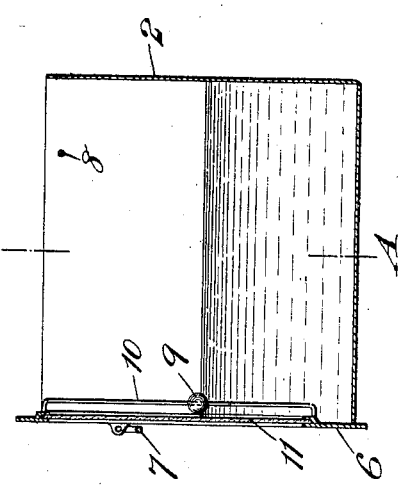
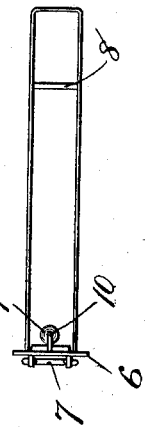
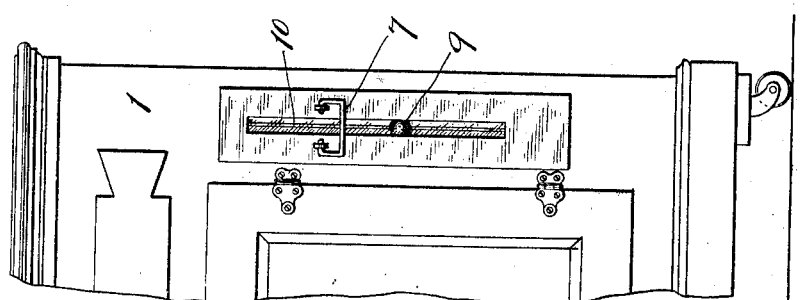
Witnesses:
George Barry Jr
Henry Thieme
Inventors:
Rudolph Frey and
Gustave Frey
by attorneys

UNITED STATES PATENT OFFICE.

RUDOLPH FREY AND GUSTAVE FREY, OF NEW YORK, N. Y.

REMOVABLE DRIP-PAN FOR REFRIGERATORS.

SPECIFICATION forming part of Letters Patent No. 719,104, dated January 27, 1903.

Application filed November 11, 1902. Serial No. 130,850. (No model.)

*To all whom it may concern:*

Be it known that we, RUDOLPH FREY and GUSTAVE FREY, citizens of the United States, and residents of the borough of Bronx, in the city and State of New York, have invented a new and useful Improvement in Removable Drip-Pans for Refrigerators, of which the following is a specification.

This invention relates to an improvement in removable drip-pans for refrigerators, and has for its object to provide a drip-pan having a water-level indicator located therein in position to be brought into direct contact with the body of water within the tank and a window for disclosing the indicator in its different positions to the observer.

A further object is to provide a water-level indicator for a removable drip-pan of a refrigerator, whereby the level of water within the pan may be readily observed at all times and which will at the same time be so arranged that it will not be liable to become broken or deranged by the rough usage to which a removable drip-pan is commonly subjected when being removed, emptied, and returned to its place within the refrigerator.

A practical embodiment of our invention is represented in the accompanying drawings, in which—

Figure 1 represents in front elevation a portion of a refrigerator with the improved removable drip-pan applied thereto. Fig. 2 is a vertical central section from front to rear through the drip-pan, showing the water-level indicator about half-way toward the top of the pan. Fig. 3 is a transverse vertical section through the pan in the plane of the line A A of Fig. 2 looking toward the front of the pan, and Fig. 4 is a top plan view of the pan.

The refrigerator in which this improved drip-pan is removably supported is denoted by 1 and may be made of any desired style.

The drip-pan is composed of a back wall 2, side walls 3 and 4, a bottom 5, and a front wall 6, forming a water-tight compartment open at its top for receiving the drip-water from the ice-receptacle in the usual manner.

The exterior of the front wall 6 of the drip-pan is provided with a suitable handle 7, and a second handle 8 is located within the drip-pan near its top and spaced from the back wall 2 of the drip-pan, so that the said handle 8 may be grasped as the pan is being removed from the refrigerator for facilitating the ease with which the said pan may be carried and the water poured therefrom.

A water-level indicator is located within the pan in position to be brought into direct contact with the water therein. This indicator comprises a float 9 and a wire guide 10 therefor, the top and bottom ends of the wire 10 being secured to the inner face of the front wall 6 of the pan, so that the body portion of the wire 10 is spaced a sufficient distance away from the said face to permit the float 9 to readily slide along the wire.

The pan is removable through the front wall of the refrigerator and the front 6 of the pan is provided with a window 11 for disclosing the float 9 in its different positions to the observer.

In practice it has been found difficult to readily observe the amount of water in the drip-pan without the employment of some indicator—such, for instance, as the float 9. By the use of this float 9 and the window in the front of the drip-pan the level of the water within the drip-pan can be readily ascertained by the observer at a glance. Furthermore, by locating the water-level indicator entirely within the pan in contact with the body of water therein we are enabled to provide a device which will not be liable to become broken or damaged by the rough usage to which the pan is ordinarily subjected when being removed, emptied, and returned to its place within the refrigerator. Furthermore, the device as hereinabove described is an extremely simple, inexpensive, and strong one.

It is evident that changes might be resorted to in the form and arrangement of the parts without departing from the spirit and scope of our invention. Hence we do not wish to limit ourselves strictly to the structure herein set forth; but

What we claim is—

A removable drip-pan for refrigerators having a water-level indicator located within the pan comprising a float in position to be brought into direct contact with the body of water therein and a wire guide for the float secured to the front of the pan and a window in the front of the pan for disclosing the indicator in its different positions to the observer.

In testimony that we claim the foregoing as our invention we have signed our names, in presence of two witnesses, this 10th day of November, 1902.

RUDOLPH FREY.
GUSTAVE FREY.

Witnesses:
GEORGE BARRY, JR.,
C. S. SUNDGREN.